(12) United States Patent
Thattai et al.

(10) Patent No.: US 10,275,221 B2
(45) Date of Patent: Apr. 30, 2019

(54) SYSTEMS AND METHODS FOR GENERATING DATA VISUALIZATION APPLICATIONS

(71) Applicant: Cisco Technology, Inc., San Jose, CA (US)

(72) Inventors: Balaji T. Thattai, San Jose, CA (US); Karthikeyan Shanmugam, San Jose, CA (US); Chi Yao, Cupertino, CA (US); Yee Lang Lau, Carol Stream, IL (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 15/052,449

(22) Filed: Feb. 24, 2016

(65) Prior Publication Data

US 2016/0259626 A1  Sep. 8, 2016

Related U.S. Application Data

(60) Provisional application No. 62/129,647, filed on Mar. 6, 2015.

(51) Int. Cl.
| | |
|---|---|
| *G06F 9/44* | (2018.01) |
| *G06F 8/10* | (2018.01) |
| *G06F 17/30* | (2006.01) |
| *G06F 8/34* | (2018.01) |
| *G06Q 10/06* | (2012.01) |
| *G06Q 10/10* | (2012.01) |

(52) U.S. Cl.
CPC .................. *G06F 8/10* (2013.01); *G06F 8/34* (2013.01); *G06F 17/303* (2013.01); *G06F 17/30294* (2013.01); *G06F 17/30557* (2013.01); *G06Q 10/06* (2013.01); *G06Q 10/103* (2013.01)

(58) Field of Classification Search
CPC ................................................ G06F 8/10–8/40
USPC .................................................. 717/101–113
See application file for complete search history.

(56) References Cited

U.S. PATENT DOCUMENTS 6,038,393 A * 3/2000 Iyengar ..................... G06F 8/20
717/104
6,167,564 A * 12/2000 Fontana ..................... G06F 8/20
717/104

(Continued)

OTHER PUBLICATIONS

Extended European Search Report in counterpart European Application No. 16762121.8, dated Oct. 23, 2018, 8 pages.

(Continued)

*Primary Examiner* — Francisco J Aponte

(57) ABSTRACT

A system provides a high-level visual programming language input through a GUI. User inputs specify a data source, a workflow, processing logic, and a data store. Multiple instances of these primitives may be combined to generate multi-dimensional domain applications. The workflow and processing logic may be specified in a graphical user interface wherein nodes representing workflow actions or processing functions are picked from a palette and placed on a diagram. Interconnections between nodes are received in the interface and represent data flows or dependencies between nodes. The high-level visual programming inputs are the translated into low-level database commands and executed within an execution framework.

22 Claims, 17 Drawing Sheets

(56) References Cited

U.S. PATENT DOCUMENTS

| | | | | |
|---|---|---|---|---|
| 6,851,107 | B1* | 2/2005 | Coad | G06F 8/20 717/108 |
| 7,370,315 | B1* | 5/2008 | Lovell | G06F 8/33 715/763 |
| 7,779,384 | B2* | 8/2010 | Lin | G06F 8/35 715/763 |
| 7,917,888 | B2* | 3/2011 | Chong | G06F 8/20 717/102 |
| 8,010,940 | B2* | 8/2011 | van Wyk | G06Q 10/06 717/104 |
| 8,042,092 | B2* | 10/2011 | Koehler | G06F 8/10 717/105 |
| 8,307,333 | B2* | 11/2012 | Peterson | G06F 8/33 717/110 |
| 8,307,334 | B2* | 11/2012 | Peterson | G06F 8/33 717/110 |
| 8,407,664 | B2* | 3/2013 | Moosmann | G06F 8/10 717/104 |
| 8,417,715 | B1* | 4/2013 | Bruckhaus | G06F 17/30994 705/26.1 |
| 8,539,444 | B2* | 9/2013 | Cao | G06F 8/38 717/115 |
| 8,676,617 | B2* | 3/2014 | Berger | G06Q 10/06316 705/7.11 |
| 8,707,249 | B2* | 4/2014 | Maine | G06F 8/10 717/104 |
| 8,818,884 | B2* | 8/2014 | Marschall | G06Q 10/063 705/28 |
| 8,843,892 | B2* | 9/2014 | Hamlin | G06F 8/34 717/120 |
| 8,924,269 | B2* | 12/2014 | Seubert | G06Q 10/06 705/35 |
| 8,949,772 | B1* | 2/2015 | Talby | G06F 8/35 717/104 |
| 9,052,907 | B2* | 6/2015 | Gores | G06Q 10/06 |
| 9,104,389 | B2* | 8/2015 | Chandra | G06F 8/24 |
| 9,130,860 | B1* | 9/2015 | Boe | G06F 17/30572 |
| 9,146,962 | B1* | 9/2015 | Boe | G06F 9/542 |
| 9,229,920 | B1* | 1/2016 | Fiedler | G06F 17/24 |
| 9,235,909 | B2* | 1/2016 | Berg | G06T 11/206 |
| 9,256,403 | B2* | 2/2016 | Limbasia | G06F 8/34 |
| 9,294,361 | B1* | 3/2016 | Choudhary | G06F 17/30572 |
| 9,329,838 | B2* | 5/2016 | Tattrie | G06F 9/4443 |
| 9,342,272 | B2* | 5/2016 | Tattrie | G06F 8/30 |
| 9,348,563 | B1* | 5/2016 | Xue | G06F 8/34 |
| 9,436,507 | B2* | 9/2016 | Mishra | G06Q 10/06 |
| 9,461,876 | B2* | 10/2016 | Van Dusen | H04L 41/04 |
| 9,753,700 | B2* | 9/2017 | Rath | G06F 8/34 |
| 9,851,968 | B2* | 12/2017 | Straub | G06F 8/71 |
| 9,858,174 | B2* | 1/2018 | Straub | G06F 11/3684 |
| 2006/0064666 | A1* | 3/2006 | Amaru | G06F 17/30557 717/100 |
| 2007/0016615 | A1* | 1/2007 | Mohan | G06F 8/20 |
| 2007/0157165 | A1* | 7/2007 | Kim | G06F 8/36 717/113 |
| 2007/0288890 | A1* | 12/2007 | Wells | G06F 8/38 717/113 |
| 2009/0222749 | A1* | 9/2009 | Marinescu | G06F 8/20 715/764 |
| 2009/0282062 | A1* | 11/2009 | Husic | G06F 21/62 |
| 2010/0281462 | A1* | 11/2010 | Festa | G06F 8/34 717/108 |
| 2011/0004612 | A1* | 1/2011 | Boyersmith | G06F 8/35 707/769 |
| 2011/0023013 | A1* | 1/2011 | Shenfield | G06F 8/35 717/107 |
| 2011/0179102 | A1 | 7/2011 | Ravichandran et al. | |
| 2011/0231280 | A1* | 9/2011 | Farah | G06Q 10/10 705/26.8 |
| 2013/0238549 | A1 | 9/2013 | Aski et al. | |
| 2014/0032606 | A1* | 1/2014 | Chandler | G06F 8/34 707/798 |
| 2014/0075413 | A1* | 3/2014 | Binjrajka | G06F 8/71 717/121 |
| 2014/0109037 | A1* | 4/2014 | Ouali | G06F 8/10 717/105 |
| 2014/0143754 | A1 | 5/2014 | Henderson | |
| 2014/0201705 | A1* | 7/2014 | Ren | G06F 8/20 717/102 |
| 2014/0223411 | A1* | 8/2014 | Slone | G06F 8/34 717/105 |
| 2014/0280476 | A1* | 9/2014 | Chiussi | H04L 67/10 709/203 |
| 2016/0011905 | A1* | 1/2016 | Mishra | G06Q 10/06 718/102 |
| 2016/0358101 | A1* | 12/2016 | Bowers | G06N 99/005 |
| 2016/0364211 | A1* | 12/2016 | Chau | G06F 8/20 |

OTHER PUBLICATIONS

"2 Getting Started with Oracle BPEL Process Manager", Oracle BPEL Process Manager Developer's Guide, 10g Release 2 (10.1.2), B14448-03, http://web.archive.org/web/20120513112957/http://docs.oracle.com/cd/B14099_19/integrate.1012/b14448/gsbpel.htm, May 13, 2012, XP055176826, 18 pages.

"7 Parallel Flow", Oracle BPEL Process Manager Developer's Guide, 10g Release 2 (10.1.2), B14448-03, http://web.archive.org/web/20120508033153/http://docs.oracle.com:80/cd/B14099_19/integrate.1012/b14448/parallel.htm#sthref1284, XP055498510, May 8, 2012, 5 pages.

"14 XSLT Mapper and Transformations", May 9, 2012, XP055498506, http://web.archive.org/web/20120509193326/http://docs.oracle.com:80/cd/B14099_19/integrate.1012/b14448/xslt_mpr.htm#sthref1622, 13 pages.

* cited by examiner

Project Details

Name
TruVantage

Description
Reference Implementation

Model the Data
Model your data to be analyzed, or stored.

⊕ New
Create a new Data Model.

Bank Health
New Data Model
Last Modified: 1/9/2015, 12:05:42

Define the Data Source
Define your data source to be processed.

⊕ New
Create a new Data Source.

Raw Customer Ac...
New Data Source
Last Modified: 2/18/2015, 14:50:21

Customers
Data from "Customer" table
Last Modified: 2/24/2015, 17:40:24

Define Data Store
Define your data store to be exposed, or used for query purposes.

Home | Projects | Applications | Configurations | Monitor | Users | Version | Logout

SYSTEMS AND METHODS FOR GENERATING DATA VISUALIZATION APPLICATIONS

RELATED APPLICATIONS

This application claims the benefit of U.S. Provisional Application 62/129,647 filed Mar. 6, 2015 and entitled Systems and Methods for Generating Advanced Analytics Applications, which is hereby incorporated by reference in its entirety.

BACKGROUND

Field of the Invention

This invention relates to systems and methods for accessing databases.

Background of the Invention

Many businesses and other entities are highly data driven. Enormous amounts of data may be available and valuable insights may be gained therefrom. However, the tools to access these data sets are complex and require sophisticated knowledge. The process of turning an idea of how to analyze data into an application that performs the desired analysis is complex and expensive.

The systems and methods disclosed herein provide an improved approach for generating applications for analyzing large data sets using data processing tools.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 9-17 are screen shots illustrating a process for generating a data access application in accordance with embodiments of the invention.

DETAILED DESCRIPTION

Figure 1:
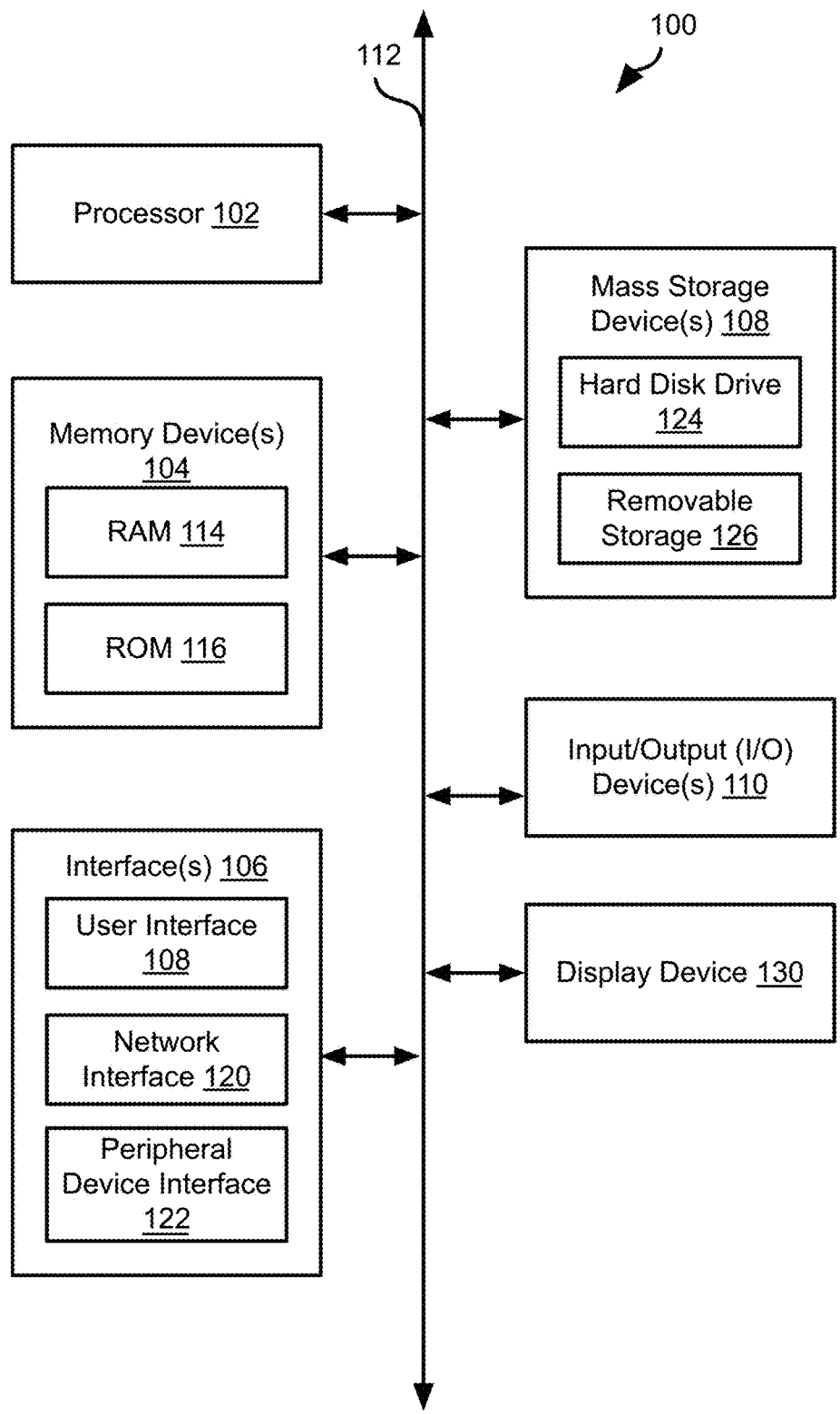
FIG. 1 is a schematic block diagram of a computing device suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like. A server system 102a-102c may include one or more computing devices 100 each including one or more processors.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
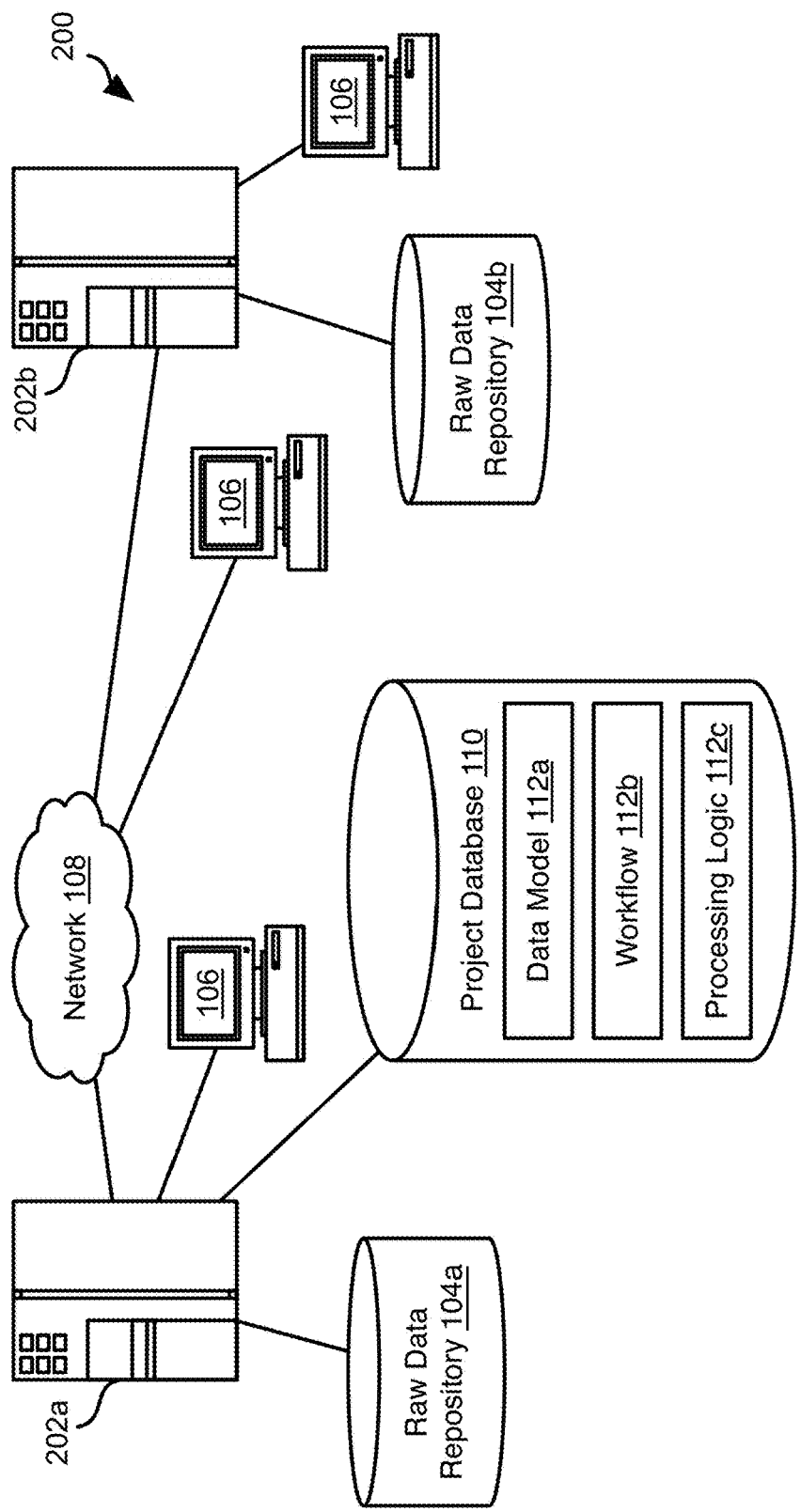
FIG. 2 is a schematic block diagram of a network environment suitable for implementing methods in accordance with an embodiments of the invention.

Referring to FIG. 2, is a schematic block diagram of a network environment 200 in which the methods disclosed herein may be implemented. The network environment may include a server system 202a that generates a database application as described herein in response to user inputs. The server system 202a or a different server system 202b. The server system 202a, 202b that executes a database application may host or access a raw data repository 104a, 104b either directly or through a remote server system 202b, 202a.

Inputs from a user defining a database application according to the methods described herein may provide inputs through a user workstation 106 that is coupled to the server system 202a directly or through another server system 202b or a network 108. The workstation 106 may be desktop or laptop computer, tablet computer, or other computing device. The network 108 may be a local area network (LAN), wide area network (WAN), the Internet, or any other type of wired or wireless network connection.

The server system 202a may host or access a project database 110 representing a database application generated according to the methods disclosed herein. In particular, the creation of the project database 110 may be performed by the server system 202a in response to user inputs according to the methods disclosed herein. A project database 110 may include a data model 112a, a workflow 112b, and processing logic 112c.

Figure 3:
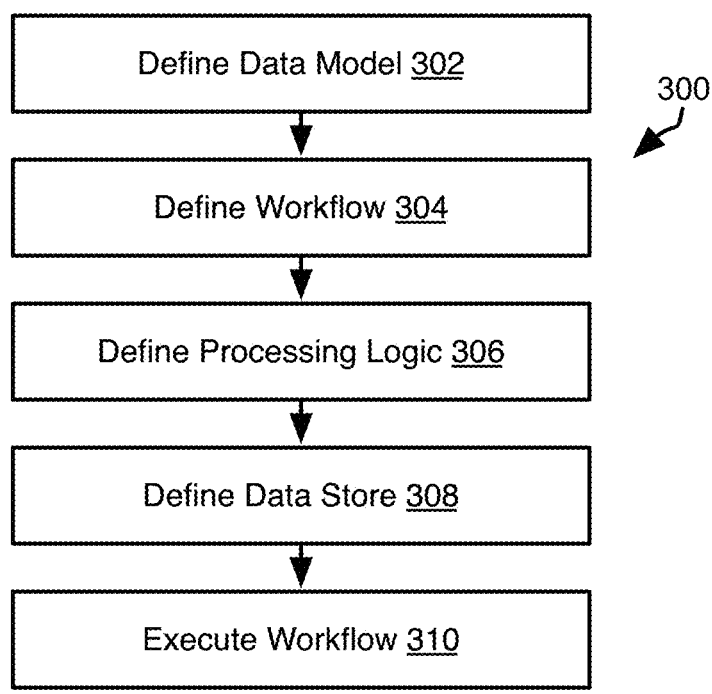
FIG. 3 is a process flow diagram of a method for generating a database application in accordance with an embodiment of the present invention.

Referring to FIG. 3, the project database 110 may be defined according to user input by performing the method 300. The method 300 may be executed by the server system 202a, a user workstation 106, or some other computing device.

The method 300 may include defining 302 a data model. The data model may be described using a high-level language, such as graphical user interface (GUI) language that specifies elements of the data model using icons, links between icons, and other GUI elements (menus, buttons, toggles), such as described herein below.

Define 302 the data model may include receiving inputs in the high level language that describe data to processed in terms of data type and data structure.

The method 300 may further include defining 304 a workflow. Again, the workflow may be defined 304 may interpreting inputs received using the high-level language described above. The workflow may describe how concurrent data processing work is to be coordinated in terms of job dependency and precedence.

The method 300 may further include defining 306 data processing logic, such as based on inputs received using the high-level language. The data processing logic may specify how one or more data sets of data elements can be transformed into other data sets of data elements. Data elements in the result data sets may therefore be formatted in a different data model depending on the data processing logic.

The method 300 may further include defining 308 a data store at which the results of the workflow and processing logic will be stored. Defining 308 the data store may include receiving inputs using the high-level language. In particular, the data store may be received as interactions with the GUI. For example, the data store may be input to a dialog box or selected from a list of available data stores. In some embodiments, the data store is created in response to the received inputs such that it is universally addressable, can be queried by property arguments, can be assigned or loaded with input data, and can be looked up and reused by some or all workflows executing on the server system 202a, 202b executing the workflows.

Defining 308 may be characterized by creating a data model that describes the data elements stored in it. The data store can be populated with input data sets of compatible data model. It can also be queried to return a data set of a different data model.

The method 300 may further include executing the workflow 304. This may include retrieving data from a raw data store 204a, 204b, applying the processing logic 306 effective to perform operations on the data and to transform the data into one or more different data models defined at step 302. The results of the processing logic 306 may then be stored in the data store defined at step 308. These steps of executing the workflow may be scheduled, prioritized, and executed according to the parameters specified in the workflow at step 304.

The workflow defined and executed according to the method 300 of FIG. 3 produces output data sets stored in the data store defined at step 308. This data store may then be used in various ways. For example, data analytics may be implemented with respect to the data store, including a query language processor. The query capability of the query language processor may include basic data transform capabilities, such as those described above with respect to the data processing logic of step 306. The query language processor may further enable the navigation of search results, including multidimensional style rollup and drill down on underlying data. The query language processor may further implement chaining of multiple queries.

A workflow defined according to the method 300 of FIG. 3 may be managed throughout a life cycle. In particular, the data model, workflow, and data store may be managed. In particular these artifacts may be subsequently redefined, created, modified, and also referred to by other artifact definitions.

These artifacts (data model, workflow, data store) may also be combined to implement higher-level logic. For example, logic for multi-dimensional data representation and analytics may be implemented for powering domain applications.

Figure 4:
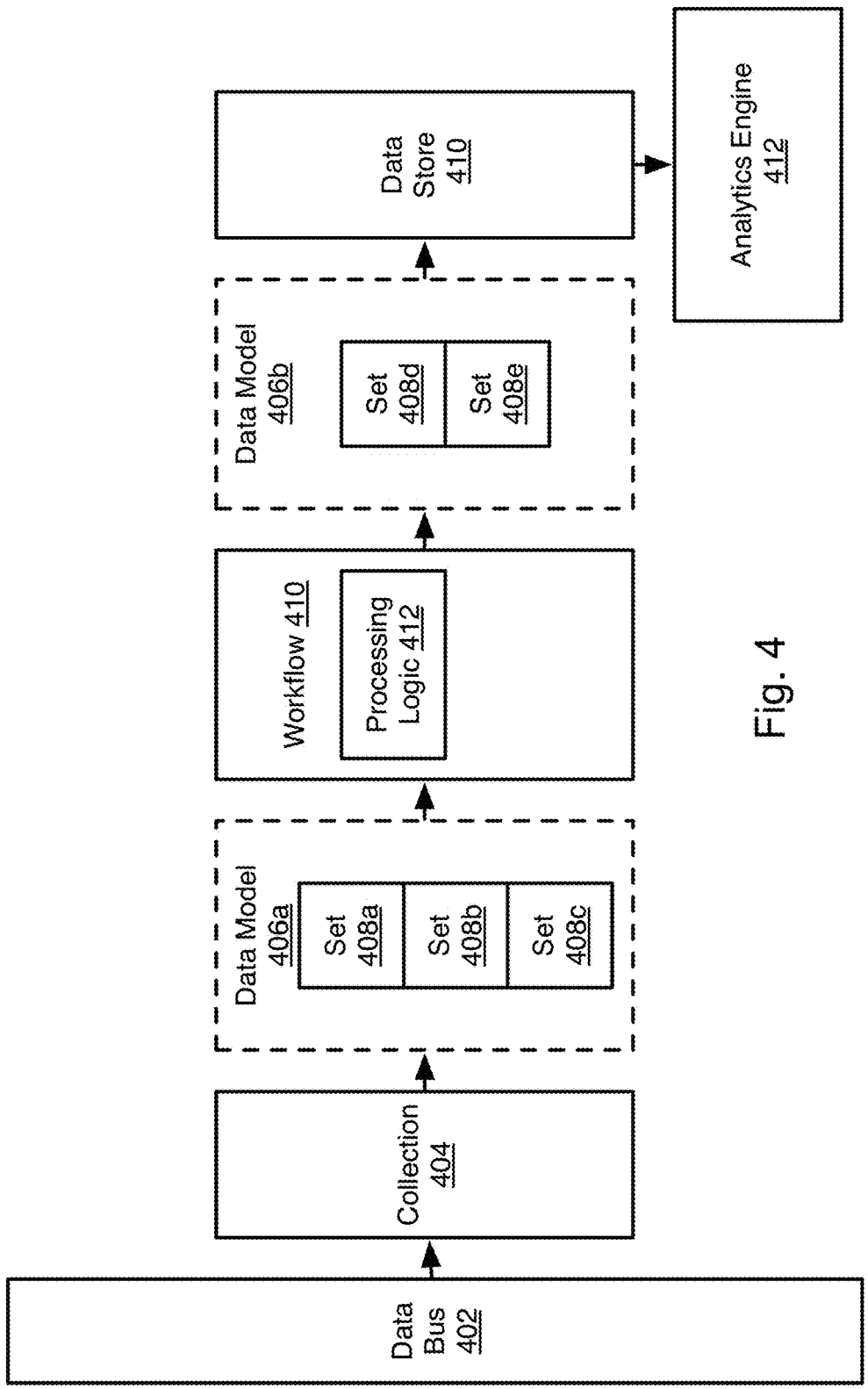
FIG. 4 is a schematic block diagram of a data flows within a database application in accordance with an embodiment of the present invention.

FIG. 4 illustrates an example implementation of an application according to the method 300 of FIG. 3. Data from a raw data store 204a, 204b may be received through a data bus 402 and collected by a collector 404. The collected data may then be converted to the data model 406a defined at step 302, including one or more sets 408a-408c of data formatted according to the data model.

The data sets 408a-408c are input to the workflow 410 as defined at step 304. The workflow then implements processing logic 412 as defined at step 306. As noted above, the workflow manages scheduling, conflicts, dependencies, and precedence among processing tasks such that the data sets 408a-408c are processed according to processing logic 412 in an efficient manner and in appropriate order.

The output of the workflow 410 will be formatted according to a same or different data model 406b. In particular, a number of data sets 408d-408e may be output from the workflow and formatted according to data model 406b. These data sets 408d-408e are then written to the data store 410 defined at step 308. The data of the data store 410 may then be subsequently provided to an analytics engine 412 that performs analysis, executes query, and performs other operations to enable the characterization or visualization of the data sets 408d-408e.

Figure 5:
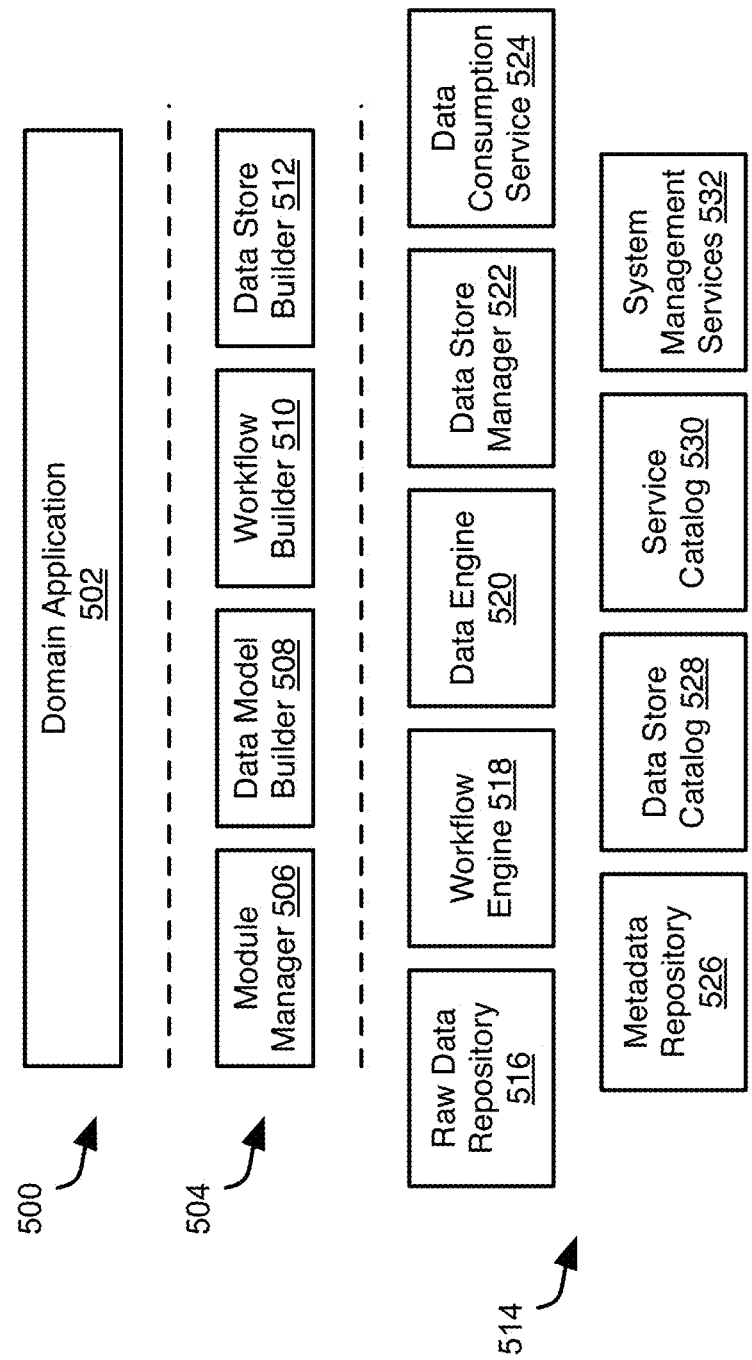
FIG. 5 is a schematic block diagram of executable modules for generating a database application in accordance with an embodiment of the present invention.

FIG. 5 illustrates software components that may implement creation of a data application according to the method 300 of FIG. 3 and execution of the data application according to the FIG. 4. Beginning at the top, an application layer 500 may include one or more domain applications 502. A domain application 502 may include a data model, workflow, processing logic, and a data store defined according to the method 300. A domain application 502 may include multiples of these elements that reference one another to implement a complex multidimensional domain application.

A platform application programming interface (API) layer 504 implements software modules that generate the domain application 502 responsive to user inputs. In particular, the API layer 504 may implement a GUI that allows users to graphically define one or more data models, workflows, processing logic, and data stores of a domain application 502.

The GUI allows users to visually construct data model, workflow and processing logic in a drag and drop style. The specifications of these elements are generated internally according to a scripting language, which is a high level expression language that can be translated into commands to backend engines for execution.

The API layer 504 may include a module manager 506 that is programmed to allows Java programmers to plug in custom logic as modules. Modules can be referenced in a workflow and thus invoked in the workflow execution.

The API layer 504 may include a data model builder 508. The data model builder 508 is programmed to enable users to specify data models. Data models are used to describe the structure and type of data elements such that data processing logic can operate on them in an appropriate manner.

The API layer 504 may include a workflow builder 510. The workflow builder 510 that is programmed to enable users to build workflows, which specify execution dependency among tasks.

The API layer 504 may include a data store builder 512. The data store builder 512 is programmed to enable users to specify data representation in underlying storage in terms of data stores. Data stores are conceptual containers of data elements of the same data model.

A platform service layer 514 implements software components that execute the domain application 502 and therefore functions as an execution framework. The platform service layer 514 are a software platform upon which multiple domain applications 502 can be built or be executed.

The platform service layer 514 is composed of a set of service engines 516-532. Each engine is responsible of a specific functional area. Each engine is able to handle multi-tenant requests. That is, applications 502 on top of it can serve different tenants (customers) such that no data logic of a tenant will interfere with the data logic of another tenant. Each engine is able to handle requests involving big data across distributed systems in a scalable way.

For example, the platform service layer 514 may include a raw data repository 516 that implements a database server providing raw data for processing by the domain application 502. For example, the raw data repository 516 may be an ORACLE, SQL, MySQL, DB2, INFORMIX, SAP, SPARK, TERADATA, or other type of database server.

The platform service layer 514 may include a workflow engine 518. As noted above, a workflow dictates dependencies and precedence among data processing tasks. Accordingly, the workflow engine 518 may schedule processing tasks and/or interrupt processing tasks in order to implement the policies specified by the workflow.

The platform service layer 514 may include a data engine 520. The data engine 520 executes processing logic as specified by a designer of the domain application 502 and as invoked by the workflow engine 518 according to the policies specified by the workflow. A data store manager 522. The data store manager 522 writes results of the processing logic to the data store.

The platform service layer 514 may implement a data consumption service 524 that is a web service that can receive queries from applications and deliver query results in response to the queries. The platform service layer 514 may function as the main query interface between application and platform services.

The platform service layer 514 may implement a metadata repository 526 that stores metadata definitions. Metadata is the information to describe the data to be processed. For example, data model and workflow are both types of metadata.

The platform service layer 514 may implement a data store catalog 528 that is a catalog of a definitions of a data store.

The platform service layer 514 may implement a service catalog that stores the information and status of all platform service engines. For example, the location (e.g. network node) where a platform service engine is executing and the status of the platform service engine (e.g., running or stopped)

The platform service layer 514 may implement system management services 532 that perform system management tasks such as temporary data purging, job scheduling, and other system management tasks known in the art.

Figure 6:
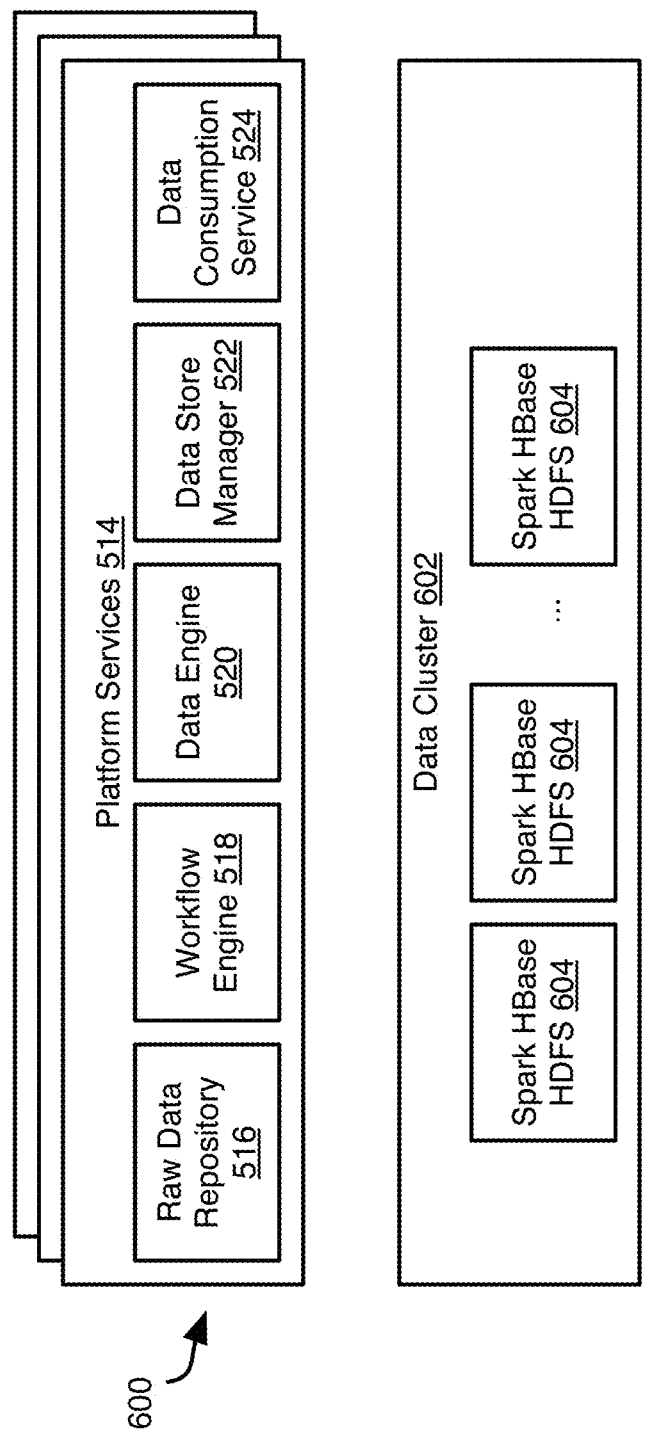
FIG. 6 is a schematic block diagram of an execution framework for executing a database application in accordance with an embodiment of the present invention.

Referring to FIG. 6, illustrates a deployment architecture for a domain application implemented according to the methods disclosed herein. In particular, a set of platform services 514 may each implement an application node 600 of a plurality of application nodes 600. The application nodes 600 may execute as described above with respect to a data cluster 602 including one or more databases 604, such as the illustrated SPARK HBASE HDFS databases. In particular, the databases 605 may function as the raw data repository 204a, 204b.

Figure 7:
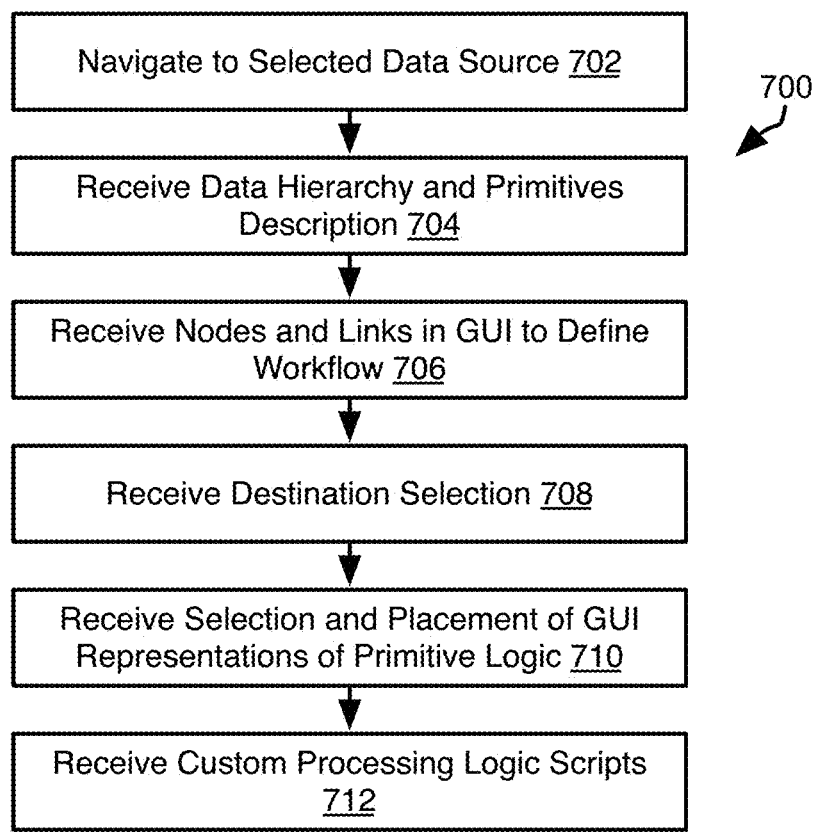
FIG. 7 is a process flow diagram of a method for generating a database application using a graphical user interface in accordance with an embodiment of the present invention.

Referring to FIG. 7, the data model, workflow, processing logic, and data store of a domain application may be specified using a high-level language, such as a visual programming language having a GUI for receiving user inputs. For example, the illustrated method 700 may be performed using the GUI. In particular, the visual programming language enables a non-programmer to describe a data pipeline that can be translated to the artifacts generated according to the method 300 for execution in the execution framework of FIG. 5. In addition the GUI of the visual programming language is enables users to construct the data processing logic using drag-and-drop components and interconnecting lines, as discussed in greater detail below.

The method 700 may include navigating 702 to a selected data source according to user inputs. Navigation may be performed using menus, hierarchical representations of a file system, or any other conventional technique for navigating a file system and receiving a user selection of a storage device, portion of a storage device, or a specific file, folder, database, or collection of databases. In particular, the navigation and selection may be performed with respect to data within a data source repository, such as a raw data repository 204a, 204b. The user may select one or more properties of a data set in addition to or instead of selecting the data set. Accordingly, a graphical display of properties and an interface for selecting one or more of them may also be displayed and a selection received using this interface.

The method 700 may further include receiving 704 through the visual programming language GUI, user inputs describing the data model in terms of data hierarchy and primitive data types. In general, a data model specifies a data element's type if it is primitive, or its structure if it is compound of two or more primitives.

The method 700 may further include receiving 706 user placement of nodes and user placement of links between nodes in the GUI, where each node represents a predefined sequence of commands selected from a palette of sequences and links indicate an execution dependency between nodes. For example, an example of nodes are node1=[command1, command2, command3], node2=[command4, command5], node3 =[command6, command7]. An example workflow showing a dependency among nodes may include workflow=[node1->node2, node3->node2], which means commands in node2 can only be executed upon completion of commands in node 1 and commands in node3 can only be executed upon completion of commands in node2.

The method 700 may further include receiving selection of a destination where data processed according to the workflow are to be saved. This may include navigating and selecting a destination in the same manner in which the data source was selected at step 302 using a visual interface to a file system and/or database.

The method 700 may further include receiving selection and placement of GUI representations of primitive logic and connecting them using lines that represent the flow of data from one primitive logic operation to the next. For example, a palette of graphical elements may be displayed, each of which may be selected and placed in the GUI and connected to other graphical elements and each of which is represents one of a library of built-in data transformation commands.

The method 700 may further include receiving custom processing logic scripts. For example, graphical elements may be placed in the GUI that represent run-time scripts provided by a user and connected as described above to represent data flow to other graphical elements. These scripts may then be executed as part of the workflow in accordance to their placement in the GUI. In particular, the execution framework may include a run-time scripting environment capable of executing the run-time scripts.

Figure 8:
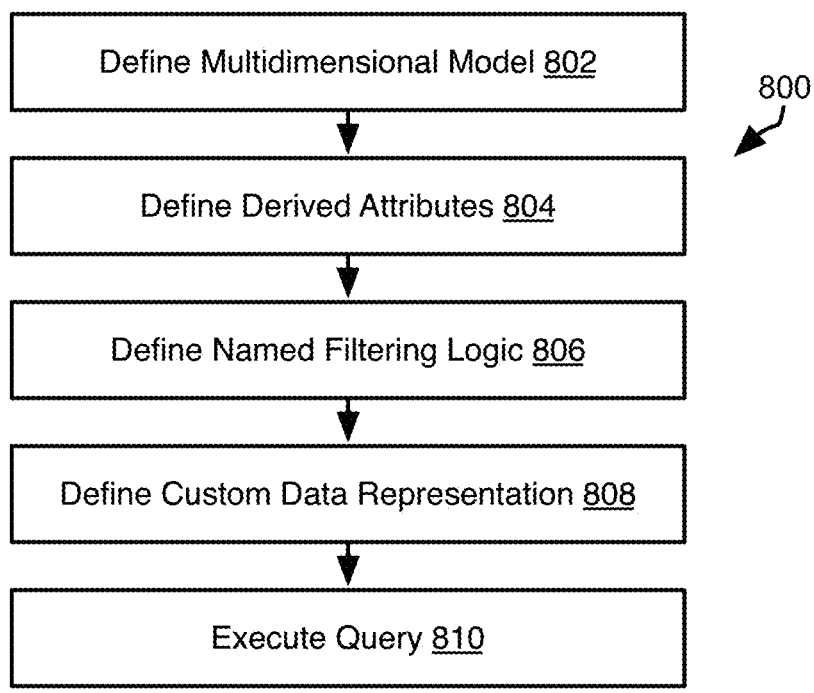
FIG. 8 is a process flow diagram of a method for defining using a multidimensional data model in accordance with an embodiment of the present invention.

Referring to FIG. 8, the systems and methods disclosed herein may provide a data representation mechanism with which users can define custom multi-dimensional models, data filtering logic, and data aggregation policy such that high performance data analysis tasks can be accomplished. This is to facilitate application designers to design the data representation to fit the need of data analysis application.

For example, an application designer may execute the illustrated method 800, including defining 802, using the visual programming language, a multi-dimension model in terms of dimensions and hierarchical member attributes. For example, a "customer" dimension may have the member attributes name, date of birth, and address. The address attribute may have the structure street-number, city, state, zip. The "customer" dimension along with other dimensions, such as a "account" and "time" dimension can form a simple multi-dimension model of an underlying data representation.

A multi-dimensional data model may be a conceptual model that describes data in terms of multiple dimensions. For example, a spread sheet with rows and columns may be a two-dimensional model. An N-dimensional data set having entries corresponding to N different dimensions, where N is greater than two may also be implemented. Such a concept can be supported by some underlying physical representation on distributed systems. Such physical representation can be constructed by executing data processing workflows that are automatically generated from a specification of the multi-dimension model.

The method 800 may further include defining 804, using the visual programming language, one or more derived attributes representing aggregated data values from raw data in simple terms. For example, "numberOfAccounts" may be a derived attribute that represents the total number of open accounts that a customer has as of a certain date. It can be defined in using a declarative language and be calculated automatically for each input data batch and stored in advance of an application to query requesting it. Accordingly, the derived values may be returned in response to a query but need not be calculated subsequent to receiving the query.

The method 800 may further include defining 806 named filtering logic to apply to a dimension based on certain query criteria so that applications can query the underlying store using the filter name to achieve proper data scoping. For example, we can define "Rich" to be those Customers with a certain zip code and apply "Rich" scoping in all customer queries without having to perform a zip code lookup in response to the query. This reduces the time required to process the query.

The method 800 may further include defining 808 customer data representations. Defining 808 custom data representation may include defining data representations tailored to various query patterns. The custom data representation may include data that is pre-aggregated at data population time so that a run time query has much better performance.

FIGS. 9 through 17 illustrate example interfaces of the GUI for the visual programming language. The illustrated interfaces may be used to provide inputs for some or all of the steps of the methods 300, 700, and 800.

Referring to FIG. 9 a project may be initiated using the illustrated interface for providing a name and description. The illustrated interface further includes elements to invoke an interface for creating a data model ("Model the Data") and for defining a source of data to be processed ("Define the Data Source"). The intent of a data analytics task is expressed by a user in a "Project". A project may begin with an expression of a "MODEL."

Figure 10:
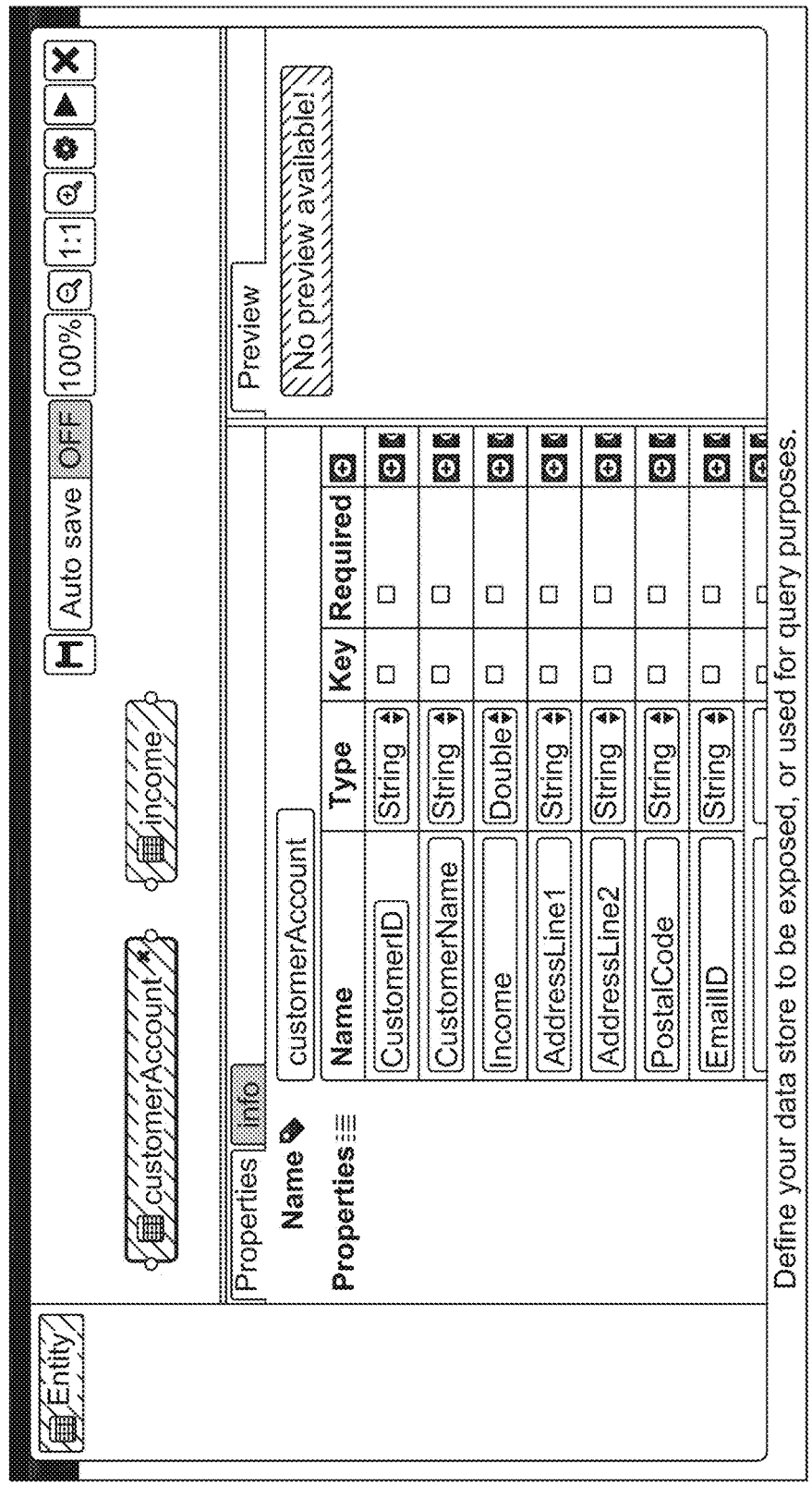
Figure 11:
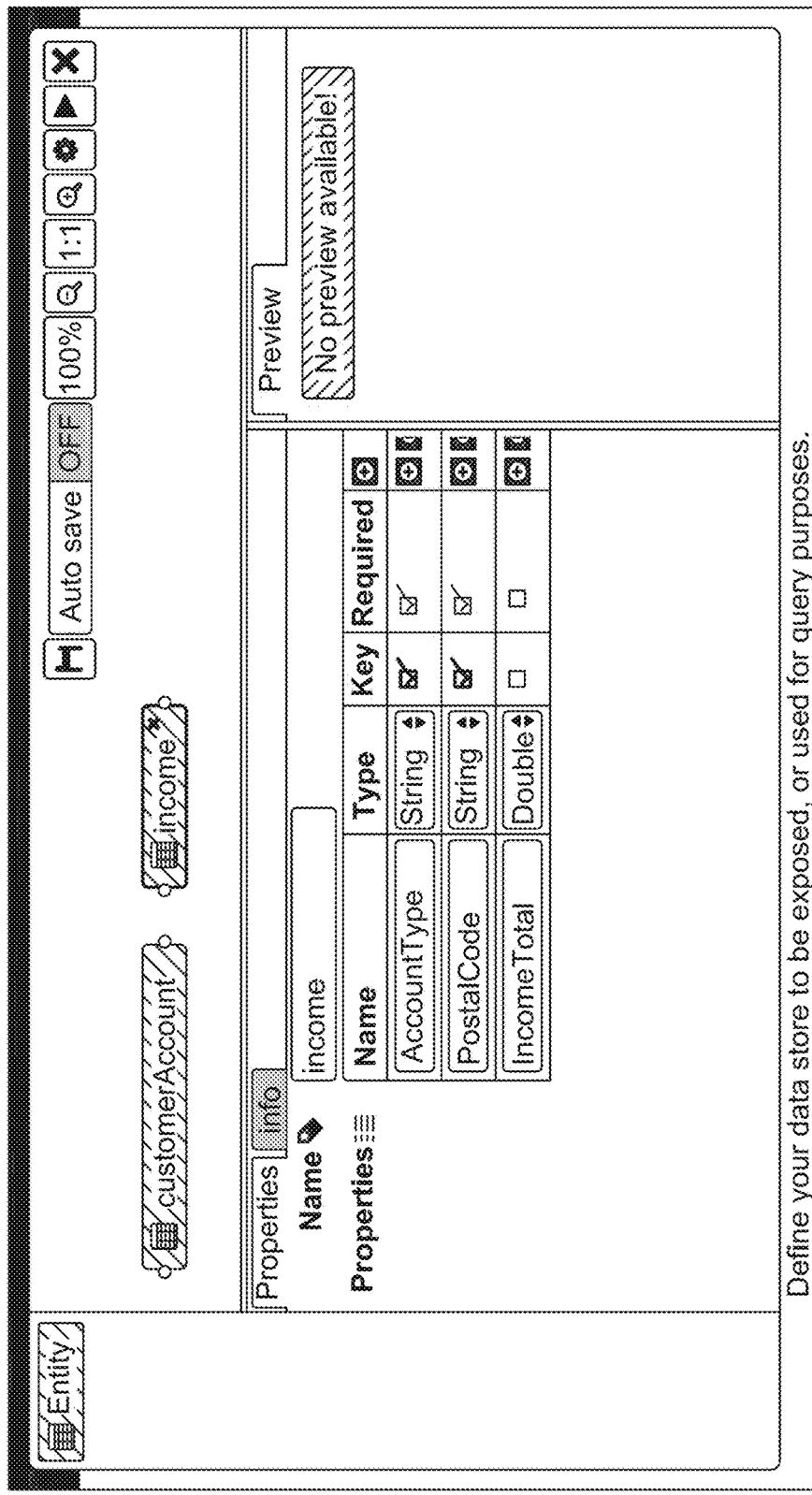

Referring to FIGS. 10 and 11, the data elements of the data model may be received from the user (step 302 of the method 300; step 704 of the method 700) using the illustrated interface. For example, data elements including "customer account" and "income" have been added to the project as shown. As shown in FIG. 3, upon receiving selection of one of the data elements, the properties thereof may be displayed ("properties" tab). The user may further select which of these properties will be used as part of the data model using the "Key" and "Required" check boxes for each property. The contents of the selected data elements, if any, may be displayed in the "Preview" tab.

Figure 12:
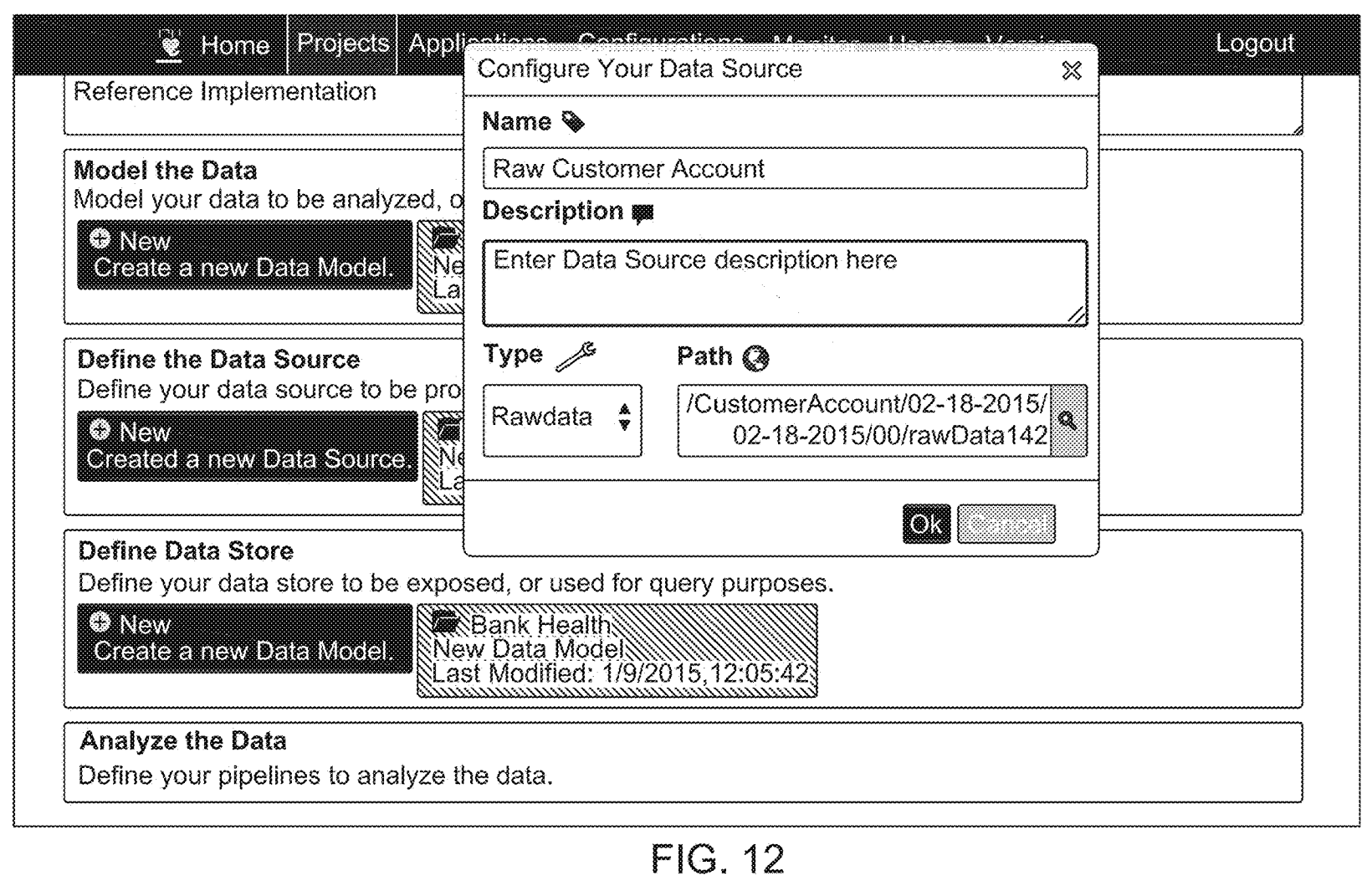

Referring to FIG. 12, the illustrated interface may be displayed in order to receive the data sources to be operated on according to the intent expressed by the user (step 702 of the method 700). The data source may be an actual data source or a data set that is pre-compiled or compiled upon access according to some query or definition used to select and/or structure the data set. Aspects of the data source needed for subsequent access may be derived automatically by the system, such as data arrival date and the like.

Figure 13:
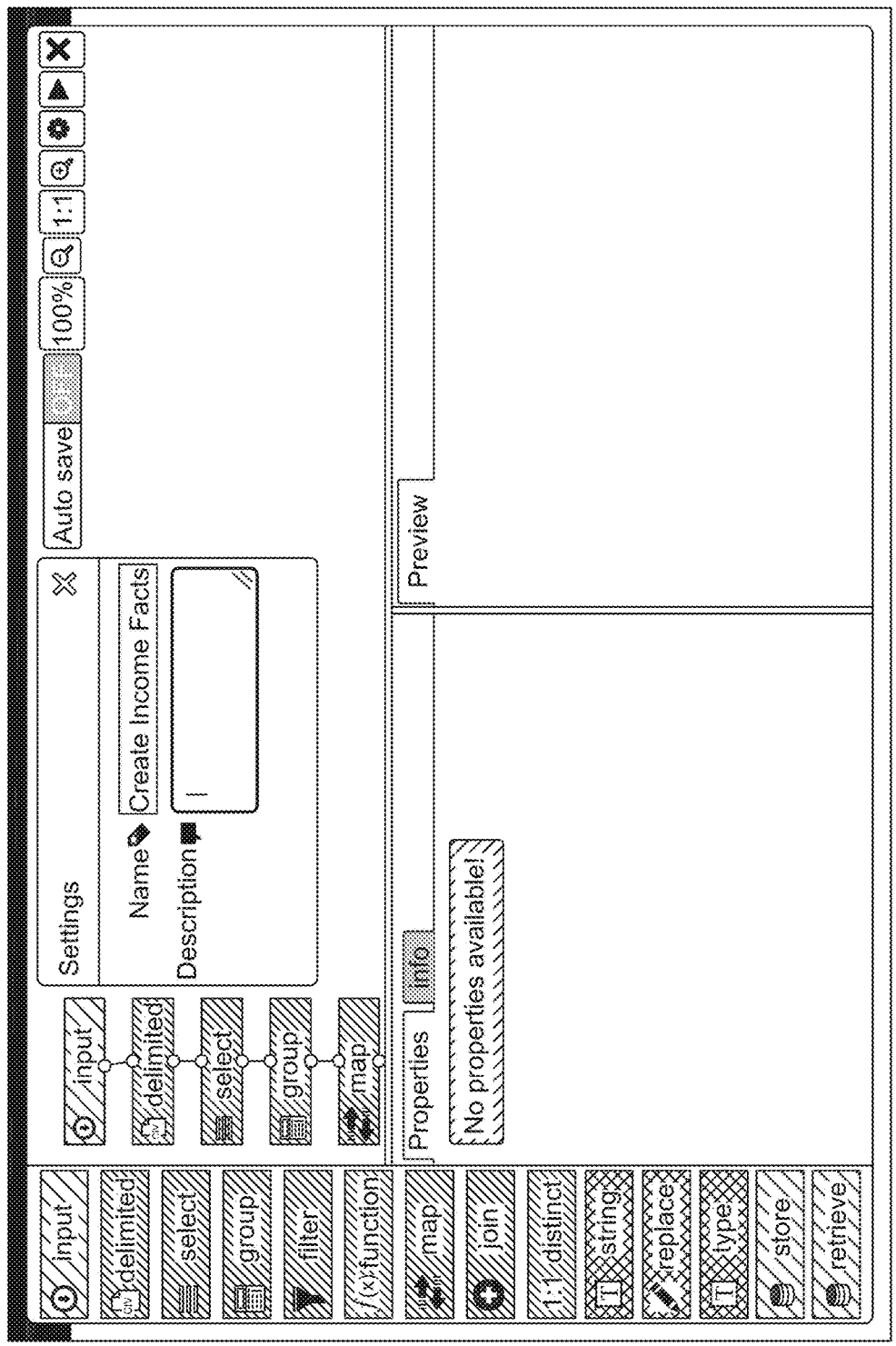

Referring to FIG. 13, the data analytics intent of the user is then input using the illustrated interface (steps 304, 306 of the method 300; steps 706, 710 of the method 700). The stages of the analysis are placed and connected using a graphical user interface. For example, the elements "input," "delimited," "select," "group," and "map" may be selected and placed using a pointing device and connected to one another using a pointing device as well. Each of the elements may represent a function to be performed on an input from another element shown. The elements may be selected from a palette of elements represent possible functions to be performed. The palette may include predefined functions, user defined functions, and the like. The functions represented by the elements may include data processing functions such as those illustrated that may be performed with respect to a large set of data.

Figure 14:
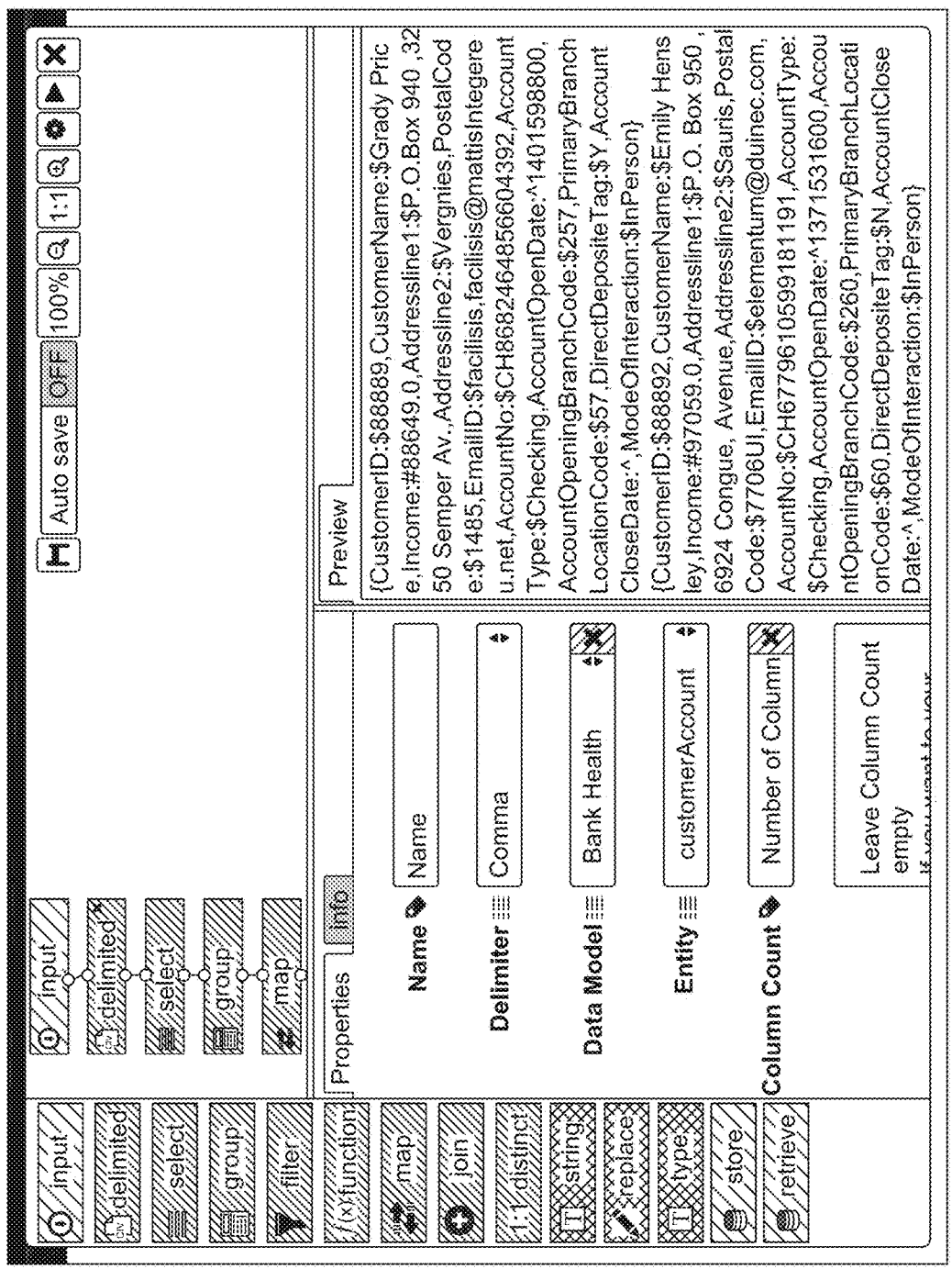
Figure 15:
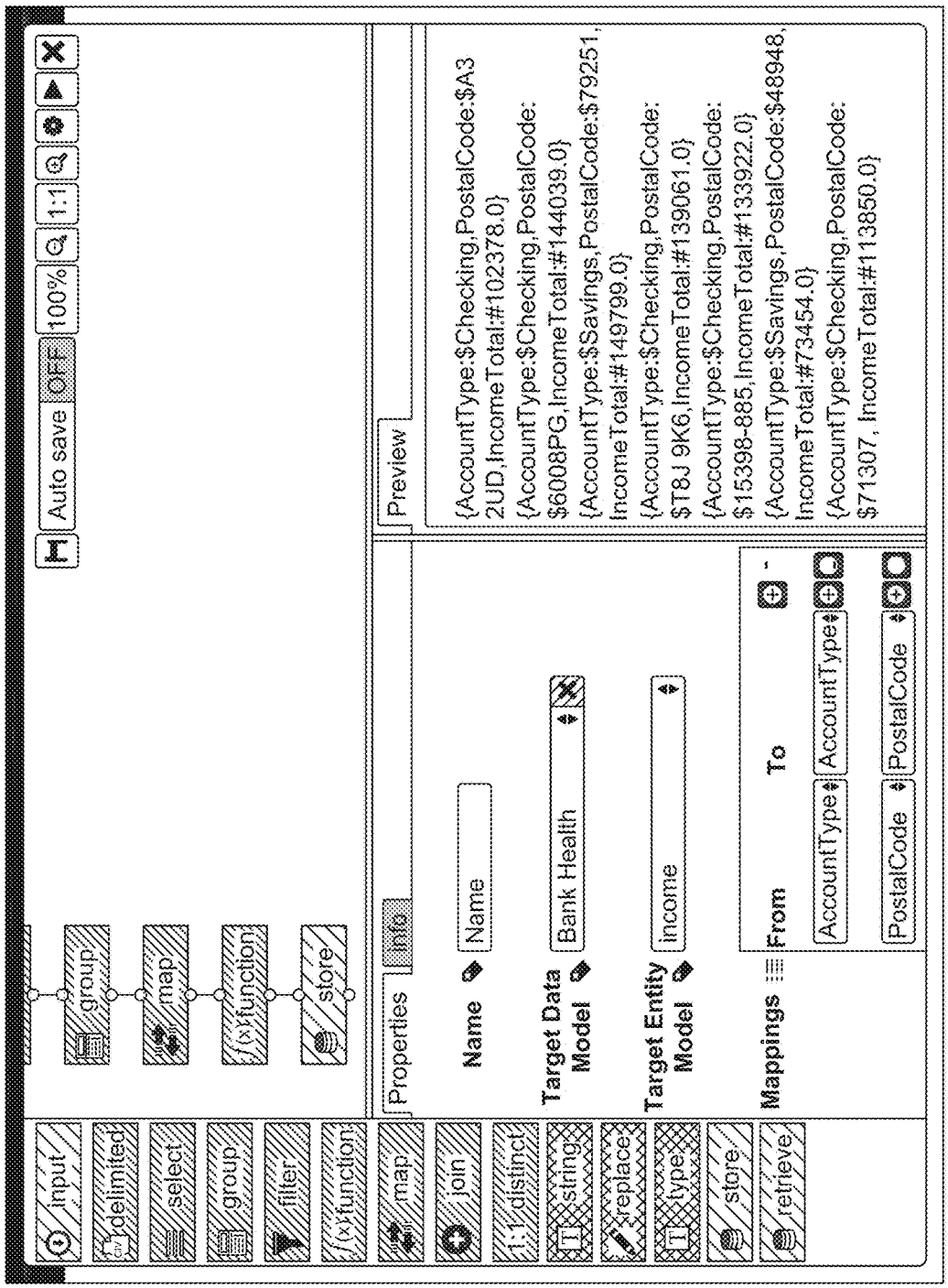

Referring to FIGS. 14 and 15, once the elements are selected and inputs and outputs defined by coupling them to one another and to the inputs and outputs, the system creates the data processing the algorithms, logic, and/or transformations required by the elements of the analytic intent. For example, as shown in the "Preview" tab of FIGS. 14 and 15, the system generates the required aggregations and calculations of each of the data elements, such as the "delimited" and "map" functions selected in FIGS. 7 and 8, which will result in the output data shown in the "Preview" tab.

The properties of elements placed by the user in the analytic intent may be selected and, in response, properties of the element may be displayed in the "Preview" tab in response to this received interaction. The properties of the element may be modified by the user by means of inputs to the "Properties" tab interface elements.

Figure 16:
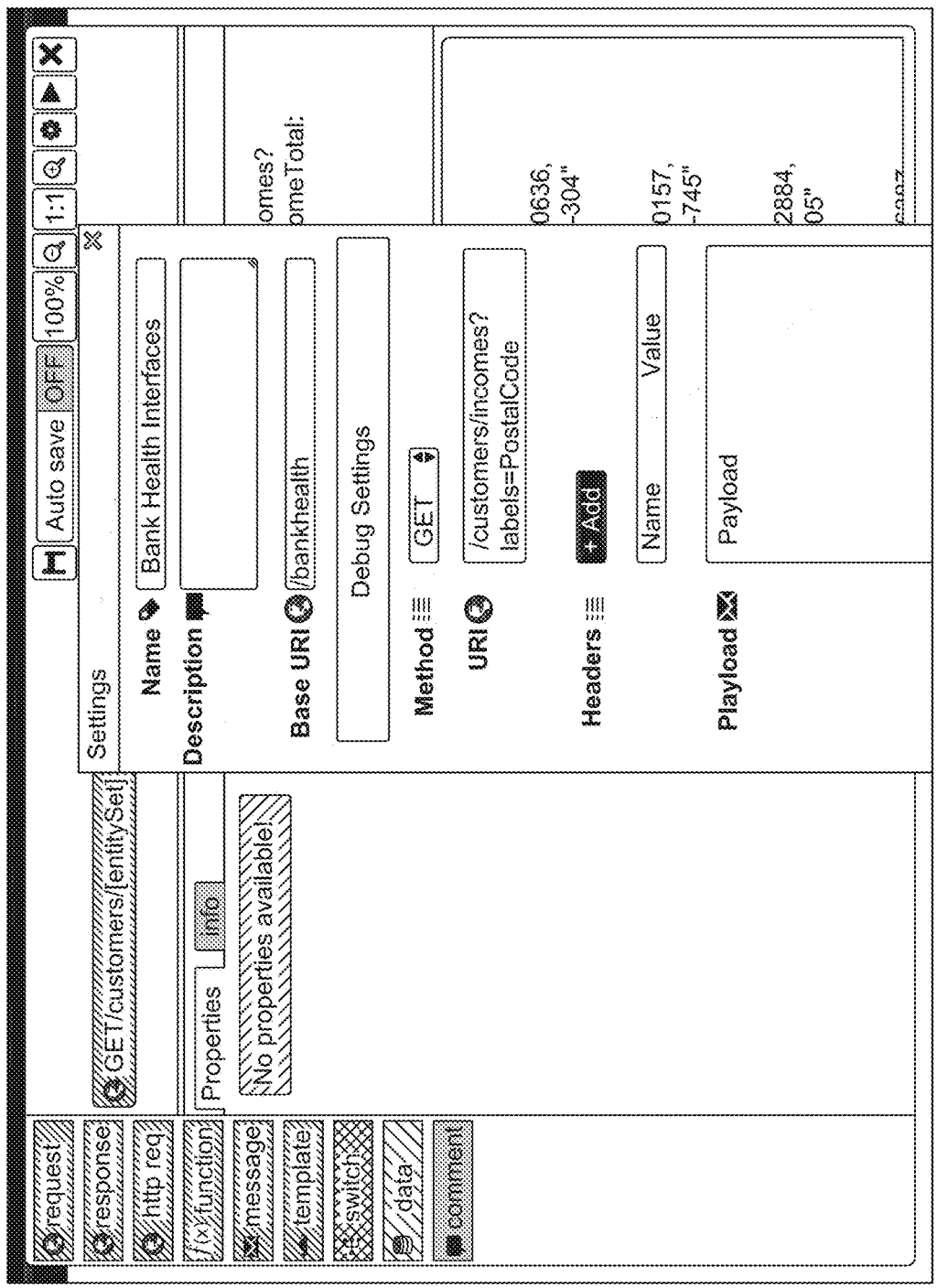

Referring to FIG. 16, the data exposure of the results of the analytic intent may then be received from the user using the illustrated interface. For example, the exposure specified by the user may be automatically implemented using RESTful (representative state transfer) APIs (application programming interface). For example, in the illustrated embodiment, the user specified a method ("Get") and uniform resource indicator ("URI") that are used to retrieve the result of the analytic intent and present it to the user. User interface elements for manipulating, filtering, or otherwise representing the output data may be specified by the user as part of the exposing step shown in FIG. 16.

Figure 17:
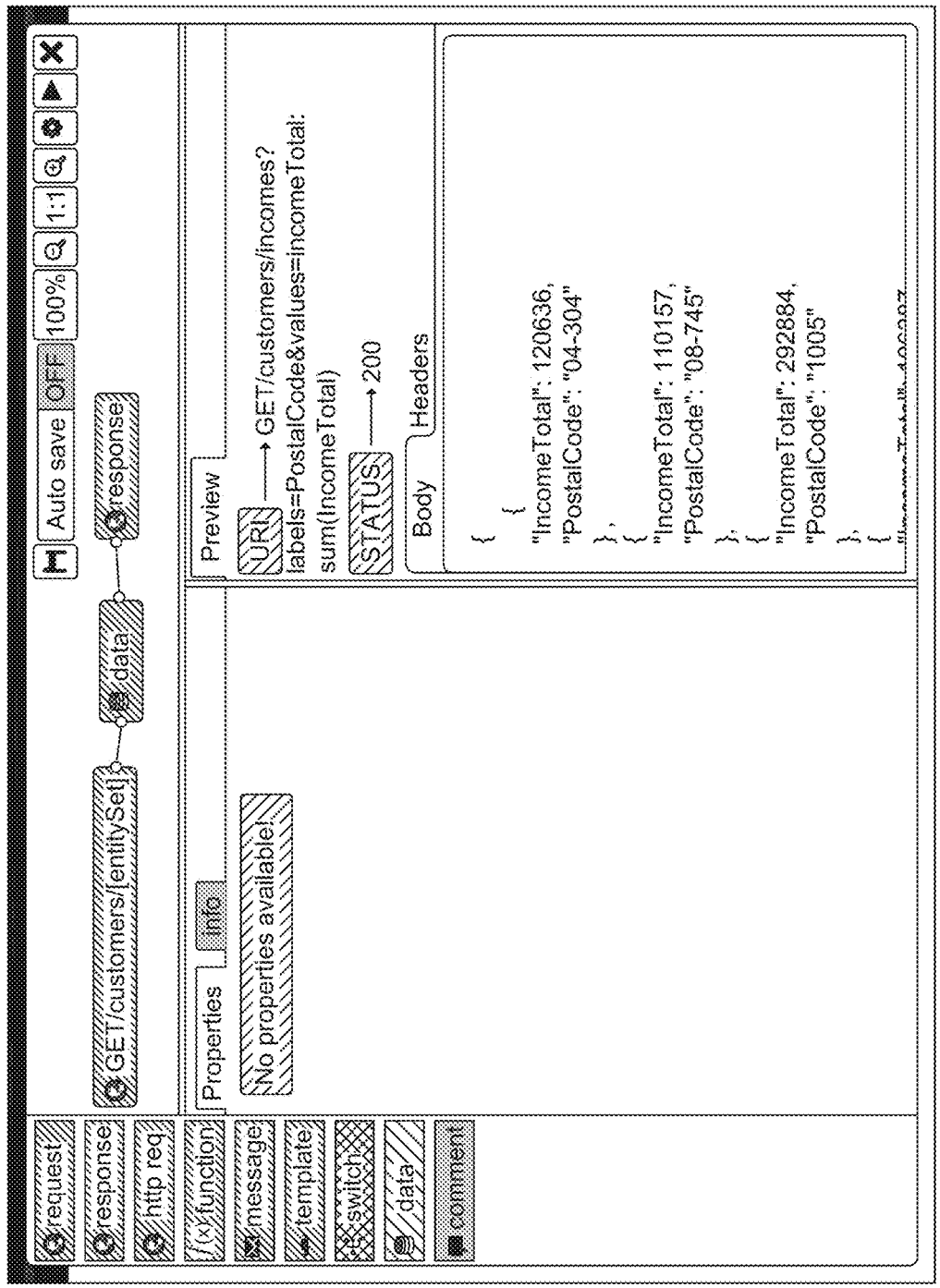

Referring to FIG. 17, the manner in which the results of the analytic intent are consumed may be specified using the illustrated interface. For example, in the illustrated embodiment, data processing functions represented by graphical elements are placed and coupled to one another to define a data flow for the output of the analytic intent. Resources and code for implementing the functions represented by the graphical elements are then instantiated. For example, the "Get" function may be written to a "data" store and invoke a "response." The properties of these functions may be adjusted by selecting the element and adjusting the properties in the "properties" tab. Likewise, upon selecting an element, the "preview" tab may display the results of the functions performed by that data element.

The systems and methods performed in response to user inputs received in the illustrated interfaces may be according to the functions described with respect to FIGS. 9 through 17. The various different screens are illustrate the steps and flow of expressing user intent in the "visual programming language." The user intent as expressed using the "visual programming language" will be translated into "a sequence of data language" by the system. The "sequence of data language" are then translated to "services commands" for actual execution.

As is apparent in the foregoing description the systems and methods disclosed herein provide the following:
Intent based advanced analytics modeling.
A data language expressed in the transformation layers of user, application, and execution levels.
Visual language translation to a data language
Advanced data applications may be generated using the above mentioned technologies.

The present invention may be embodied in other specific forms without departing from its spirit or essential characteristics. The described embodiments are to be considered in all respects only as illustrative, and not restrictive.

The invention claimed is:

1. A method for generating data applications, the method comprising:
receiving, by a server system through a graphical user interface, an input data model defining an input data type and an input data structure and an output data model defining an output data type and an output data structure, wherein the input data model is constructed by executing data processing workflows that are automatically generated from a specification of a multi-dimensional model;
receiving, by the server system through the graphical user interface, a workflow, the workflow describing coordination of concurrent data processing work with respect to job dependency and precedence;
receiving, by the server system through the graphical user interface, data processing logic, the data processing logic specifying a transformation of one or more input data sets into one or more output data sets to be performed during execution of the workflow, wherein the one or more input data sets are formatted according to the input data model and the one or more output data sets are formatted according to the output data model, and wherein the input data model is different than the output data model;
receiving, by the server system through the graphical user interface, a specification of a data source to input to the workflow, wherein receiving the specification of the data source comprises receiving, in the graphical user interface, a selection of the data source and at least one property from a graphical representation of a data source repository;
receiving, by the server system through the graphical user interface, a specification of a data store to store an output of the workflow, wherein the data store defines the output data model describing data elements stored in the data store;
generating a domain application to provide an execution framework for the workflow;
executing, by the server system, the domain application;
receiving, by the data store, a query;
obtaining, by the data store, a result of the query;
transforming, by the data store, the result of the query into a transformed result having a different data model than the output data model; and
returning, by the data store, the transformed result.

2. The method of claim 1, wherein the data store is universally addressable, wherein the data store is configured to receive queries including property arguments, and wherein the data store is configured to receive assignment of input data or to be loaded with the input data.

3. The method of claim 1, further comprising:
managing, by the server system, the creating of one or more additional data models, one or more additional workflows, and one or more additional data flows.

4. The method of claim 3, where creating the one or more additional data models, the one or more additional workflows, and the one or more additional data flows comprises including in at least one of the one or more additional data models, the one or more additional workflows, the one or more additional data flows, references to the output data model, the workflow, and the data store.

5. The method of claim 4, further comprising:
combining the one or more additional data models, the one or more additional workflows, and the one or more additional data flows with the output data model, the workflow, and the data store;
wherein generating comprises generating one or more multi-dimensional domain applications.

6. The method of claim 5, wherein executing the domain application comprises executing the workflow within the execution framework, the execution framework comprising a plurality of service engines, the service engines comprising:
a raw data repository, the data source referencing the raw data repository;
a workflow engine configured to execute the workflow;
a data engine configured to execute the data processing logic;
a data store manager configured to manage storage of data within the data store; and
a data consumption service configured to retrieve data from the raw data repository for consumption by the workflow engine.

7. The method of claim 5, wherein executing includes executing multiple multi-dimensional domain applications simultaneously by the execution framework.

8. The method of claim 1, wherein receiving, by the server system, the specification of the data source comprises receiving, in the graphical user interface, a selection of the data source and at least one property from a graphical representation of a data source repository.

9. The method of claim 8, wherein receiving the data model comprises receiving, by the server system through the graphical user interface, a description of the data model with respect to a data hierarchy and one or more primitive data types.

10. The method of claim 9, wherein receiving the workflow comprises receiving, by the server system through the graphical user interface, placement of nodes and linking of nodes, wherein each node represents a sequence of commands and each link represents an execution dependency between nodes connected by the link.

11. The method of claim 10, wherein receiving the specification of the data store comprises receiving, by the server system through the graphical user interface, selection of a data destination.

12. The method of claim 11, wherein receiving the data processing logic comprises receiving, by the server system through the graphical user interface, placement of graphical elements, each graphical element representing a primitive logic function from a library of transformation commands.

13. The method of claim 12, wherein receiving the data processing logic further comprises receiving run-time scripts through the graphical user interface.

14. The method of claim 13, wherein receiving the output data model further comprises receiving definitions of derived attributes representing aggregated data values from raw data.

15. The method of claim 14, wherein receiving the output data model further comprises defining named filtering logic and applying the named filtering logic to a dimension of the plurality of dimensions according to a query criteria.

16. The method of claim 15, further comprising:
receiving a custom data representation mapped to a query pattern; and
aggregating data in the data store according to the custom data representation prior to receiving a query according to the query pattern.

17. An apparatus comprising:
a communication interface configured to enable network communications;
at least one processor coupled to the communication interface, wherein the at least one processor is configured to:
receive, through a graphical user interface, an input data model defining an input data type and an input data structure and an output data model defining an output data type and an output data structure, wherein the input data model is constructed by executing data processing workflows that are automatically generated from a specification of a multi-dimensional model;
receive, through the graphical user interface, a workflow, the workflow describing coordination of concurrent data processing work with respect to job dependency and precedence;
receive, through the graphical user interface, the data processing logic specifying transformation of one or more input data sets into one or more output data sets to be performed during execution of the workflow, wherein the one or more input data sets are formatted according to the input data model and the one or more output data sets are formatted according to the output data model, and wherein the input data model is different than the output data model;
receive, through the graphical user interface, a specification of a data source to input to the workflow, wherein receiving, by the server system, the specification of the data source comprises receiving, in the graphical user interface, a selection of the data source and at least one property from a graphical representation of a data source repository;
receive, through the graphical user interface, a specification of a data store to store an output of the workflow, wherein the data store defines the output data model describing data elements stored in the data store;
generate a domain application to provide an execution framework for the workflow;
execute the domain application;
receive, by the data store, a query;
obtain, by the data store, a result of the query;
transform, by the data store, the result of the query into a transformed result having a different data model than the output data model; and
return, by the data store, the transformed result.

18. The apparatus of claim 17, wherein the data store is universally addressable, wherein the data store is configured to receive queries including property arguments, and wherein the data store is configured to receive assignment of input data or to be loaded with the input data.

19. The apparatus of claim 17, wherein the at least one processor is configured to:
create one or more additional data models, one or more additional workflows, and one or more additional data flows.

20. The apparatus of claim 19, wherein the at least one processor is configured to create the one or more additional data models, the one or more additional workflows, and the one or more additional data flows by including in at least one of the one or more additional data models, the one or more additional workflows, the one or more additional data flows, references to the output data model, the workflow, and the data store.

21. The apparatus of claim 20, wherein the at least one processor is configured to:
combine the one or more additional data models, the one or more additional workflows, and the one or more additional data flows with the output data model, the workflow, and the data store; and
generate one or more multi-dimensional domain applications.

22. The apparatus of claim 20, wherein the at least one processor is configured to execute multiple multi-dimensional domain application simultaneously by the execution framework.

* * * * *